(12) United States Patent
Jin et al.

(10) Patent No.: US 7,383,236 B2
(45) Date of Patent: Jun. 3, 2008

(54) FUZZY PREFERENCES IN MULTI-OBJECTIVE OPTIMIZATION (MOO)

(75) Inventors: Yaochu Jin, Rodgau (DE); Bernhard Sendhoff, Bruchköbel (DE)

(73) Assignee: Honda Research Institute Europe GmbH, Offenbach/Main (DE)

(*) Notice: Subject to any disclaimer, the term of this patent is extended or adjusted under 35 U.S.C. 154(b) by 254 days.

(21) Appl. No.: 10/501,378

(22) PCT Filed: Dec. 10, 2002

(86) PCT No.: PCT/EP02/14002

§ 371 (c)(1),
(2), (4) Date: Apr. 11, 2005

(87) PCT Pub. No.: WO03/060821

PCT Pub. Date: Jul. 24, 2003

(65) Prior Publication Data

US 2005/0177530 A1    Aug. 11, 2005

(30) Foreign Application Priority Data

Jan. 17, 2002 (EP) .................................. 02001252
Feb. 15, 2002 (EP) .................................. 02003557

(51) Int. Cl.
*G06F 15/18* (2006.01)
*G06N 3/00* (2006.01)
*G06N 3/12* (2006.01)

(52) U.S. Cl. ........................................ 706/13; 706/913
(58) Field of Classification Search .................. 706/13, 706/913

See application file for complete search history.

(56) References Cited

U.S. PATENT DOCUMENTS

2002/0099929 A1* 7/2002 Jin et al. ...................... 712/220

OTHER PUBLICATIONS

Jin, Y. et al. "Adapting Weighted Aggregation for Multiobjective Evolution Strategies" pp. 96-110, Springer-Vertag Berlin Heidelberg. Mar. 2001.*
Fonseca,C. et al. "Multiobjective Optimization and Multiple Constraint handling with evolutionary Algorithms—Part I: A Unified Formulation" IEEE Transactions on Systems, Man, and Cybernetics—Part A: Systems and Humans, IEEE, pp. 26-37, vol. 28, No. 1. Jan. 1998.*
Oyama,A et al. "Euler/Navier-Stokes Optimization of Supersonic Wing Design Based on Evolutionary Algorithm" 1999.*

(Continued)

*Primary Examiner*—David Vincent
*Assistant Examiner*—Benjamin Buss
(74) *Attorney, Agent, or Firm*—Fenwick & West LLP (57) ABSTRACT

A method to obtain the Pareto solutions that are specified by human preferences is suggested. The main idea is to convert the fuzzy preferences into interval-based weights. With the help of the dynamically-weighted aggregation method, it is shown to be successful to find the preferred solutions on two test functions with a convex Pareto front. Compared to the method described in "Use of Preferences for GA-based Multi-Objective Optimization" (Proceedings of 1999 Genetic and Evolutionary Computation Conference, pp. 1504-1510, 1999) by Cvetkovic et al., the method according to the invention is able to find a number of solutions instead of only one, given a set of fuzzy preferences over different objectives. This is consistent with the motivation of fuzzy logic.

9 Claims, 6 Drawing Sheets

OTHER PUBLICATIONS

Cvetkovic, D. et al. "Genetic Algorithm-based Multi-objective Optimisation and Conceptual Engineering Design" IEEE. 1999.*

Blumel, A. et al., "Multiobjective Optimization Of Fuzzy Logic Scheduled Controllers For Missile Autopilot Design," IEEE, 2001, pp. 1758-1763.

Coello Coello, C.A., "Handling Preferences In Evolutionary Multiobjective Optimization: A Survey," IEEE, 2000, pp. 30-37.

Cvetkovic, D. et al., "Use Of Preferences For GA-Based Multi-Objective Optimisation," In GECCO '99, Jul. 13-17, 1999, 6 pages.

Dasgupta, D. et al., "Evolutionary Algorithms—An Overview," 11 pages, 1997.

Deb, K., "Evolutionary Algorithms For Multi-Criterion Optimization in Engineering Design," 14 pages, 1999.

Fonseca, C. et al., "Multiobjective Optimization And Multiple Constraint Handling With Evolutionary Algorithms—Part I: A Unified Formulation," IEEE Transactions On Systems, Man, And Cybernetics—Part A: Systems And Humans, IEEE, Jan. 1998, pp. 26-37, vol. 28, No. 1.

International Search Report, PCT/EP02/14002, Mar. 21. 2003, 4 pages.

Jin, Y. et al., "Adapting Weighted Aggregation For Multiobjective Evolution Strategies," 2001, pp. 96-110, Springer-Vertag Berlin Heidelberg, Mar. 2001.

Jin, Y. et al., "Dynamic Weighted Aggregation For Evolutionary Multi-Objective Optimization: Why Does It Work And How?" 8 pages. GECCO '2001, Jul. 2001.

Jin, Y. et al., "Managing Approximate Models In Evolutionary Aerodynamic Design Optimization," IEEE, 2001, pp. 592-599.

Van Veldhuizen, D. A. et al., "Multiobjective Evolutionary Algorithms: Analyzing The State-Of-The-Art," Evolutionary Computation, 2000, pp. 125-147, vol. 8, No. 2.

Written Opinion, PCT/EP02/14002. Apr. 30, 2004, 8 pages.

* cited by examiner

FUZZY PREFERENCES IN MULTI-OBJECTIVE OPTIMIZATION (MOO)

This application is a 371 of PCT/EP02/14002 filed on Dec. 10, 2002. This application also claims priority based on application 02001252.2 filed in with the European Patent Office on Jan. 17, 2002 and application 02003557.2 filed with the European Patent Office on Feb. 15, 2002.

The present invention relates to a method for the optimization of multi-objective problems using evolutionary algorithms, to the use of such a method for the optimization of aerodynamic or hydrodynamic bodies as well as to a computer software program product for implementing such a method.

The background of the present invention is the field of evolution algorithms. Therefore, with reference to FIG. 1, at first the known cycle of an evolutionary algorithm will be explained.

Figure 1:
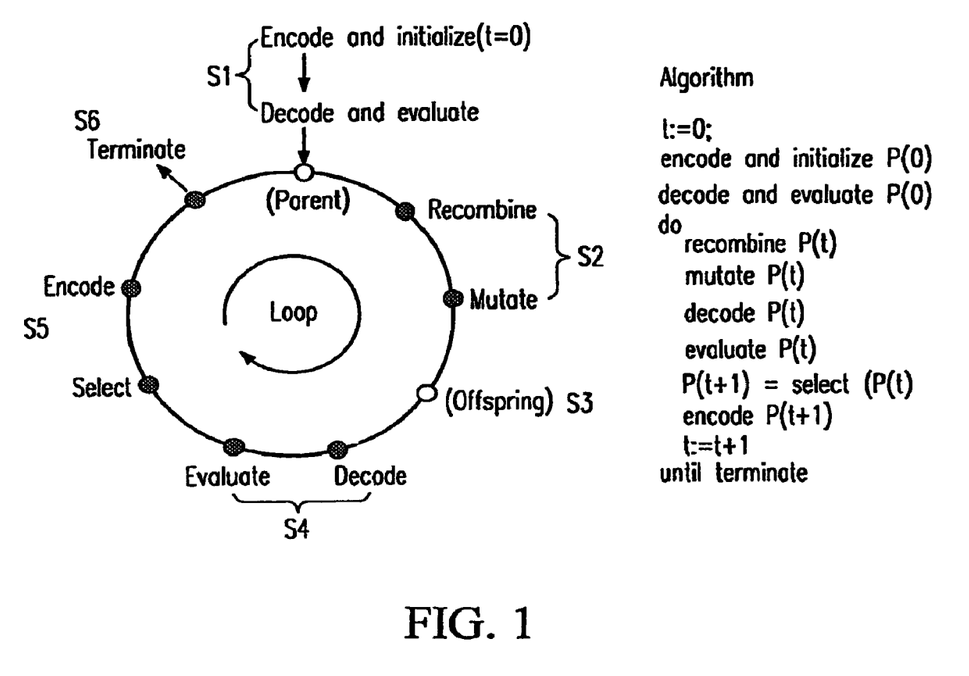
FIG. 1 shows a cycle of an evolution strategy.

In a step S1, the object parameters to be optimized are encoded in a string called 'individual'. A plurality of such individuals comprising the initial parent generation is then generated and the quality (fitness) of each individual in the parent generation is evaluated. In a step S2, the parents are reproduced by applying genetic operators called mutation and recombination. Thus, a new generation is reproduced in step S3, which is called the offspring generation. The quality of the offspring individuals is evaluated using a fitness function that is the objective of the optimization in step S4. Finally, depending on the calculated quality value, step S5 selects, possibly stochastically, the best offspring individuals (survival of the fittest) which are used as parents for the next generation cycle if the termination condition in step S6 is not satisfied.

Before evaluating the quality of each individual, decoding may be needed depending on the encoding scheme used in the evolutionary algorithm. It should be noted that the steps S2, The algorithm of this evolutionary optimization can be expressed by the following pseudo-code:

```
t := 0
encode and initialize P(0)
decode and evaluate P(0)
do
    recombine P(t)
    mutate P(t)
    decode P(t)
    evaluate P(t)
    P(t+1) := select P(t)
    encode P(t+1)
    t := t + 1
until terminate
```

Thereby,

P(0) denotes the initial population size (t=0),

P(t) denotes the offspring population size in the t-th successor generation (t>0), t is the index for the generation number ($t \in N_0$).

Such evolutionary algorithms are known to be robust optimizers that are well-suited for discontinuous and multi-modal objective functions. Therefore, evolutionary algorithms have successfully been applied e.g. to mechanical and aerodynamic optimization problems, including preliminary turbine design, turbine blade design, multi-disciplinary rotor blade design, multi-disciplinary wing platform design and a military airframe preliminary design.

For example, details on evolutionary algorithms can be found in "Evolutionary Algorithms in Engineering Applications" (Springer-Verlag, 1997) by Dasgupta et al., and "Evolutionary Algorithms in Engineering and Computer Science" (John Wiley and Sons, 1999) by Miettinnen et al.

In the framework of the present invention, the evolutionary algorithms are applied to the simultaneous optimization of multiple objectives, which is a typical feature of practical engineering and design problems. The principle multi-objective optimization differs from that in a single-objective optimization. In single-objective optimization, the target is to find the best design solution, which corresponds to the minimum or maximum value of the objective function. On the contrary, in a multi-objective optimization with conflicting objectives, there is no single optimal solution. The interaction among different objectives gives rise to a set of compromise solutions known as the Pareto-optimal solutions. A definition of 'Pareto-optimal' and 'Pareto front' can be found in "Multi-Objective Evolutionary Algorithms: Analyzing the State of the Art" (Evolutionary Computation, 8(2), pp. 125-147, 2000) by D. A. Van Veldheizen and G. B. Lamont.

Since none of these Pareto-optimal solutions can be identified as better than others without any further consideration, the target in a multi-objective optimization is to find as many Pareto-optimal solutions as possible. Once such solutions are found, it usually requires a higher-level decisionmaking with other considerations to choose one of them for implementation.

Usually, there are two targets in a multi-objective optimization:

(i) finding solutions close to the true Pareto-optimal solutions, and (ii) finding solutions that are widely different from each other.

The first task is desired to satisfy optimality conditions in the obtained solutions. The second task is desired to have no bias towards any particular objective function.

In dealing with multi-objective optimization problems, classical search and optimization methods are not efficient, simply because most of them cannot find multiple solutions in a single run, thereby requiring them to be applied as many times as the number of desired Pareto-optimal solutions, multiple application of these methods do not guarantee finding widely different Pareto-optimal solutions, and most of them cannot efficiently handle problems with discrete variables and problems having multiple optimal solutions.

On the contrary, the studies on evolutionary search algorithms, over the past few years, have shown that these methods can efficiently be used to eliminate most of the difficulties of classical methods mentioned above. Since they use a population of solutions in their search, multiple Pareto-optimal solutions can, in principle, be found in one single run. The use of diversity-preserving mechanisms can be added to the evolutionary search algorithms to find widely different Pareto-optimal solutions.

A large number of evolutionary multi-objective algorithms (EMOA) have been proposed. So far, there are three main approaches to evolutionary multi-objective optimization, namely, aggregation approaches, population-based non-Pareto approaches and Pareto-based approaches. In the recent years, the Pareto-based approaches have been gaining increasing attention in the evolutionary computation community and several successful algorithms have been proposed. Unfortunately, the Pareto-based approaches are often very time-consuming.

Despite their shortcomings, weighted aggregation approaches to multi-objective optimization according to the state of the art are very easy to implement and computationally efficient. Usually, aggregation approaches can provide only one Pareto-solution if the weights are fixed using problem-specific prior knowledge. However, it is also possible to find more than one Pareto solution using this method by changing the weights during optimization. The weights of the different objectives are encoded in the chromosome to obtain more than one Pareto solutions. Phenotypic fitness sharing is used to keep the diversity of the weight combinations and mating restrictions are required so that the algorithm can work properly.

It has been found that the shortcomings of the conventional aggregation approach can be overcome by systematically changing the weights during optimization without any loss of simplicity and efficiency. Three methods have been proposed to change the weights during optimization to approximate the Pareto front. The randomly-weighted aggregation (RWA) method dividuals within the population and the weights are redistributed in each generation. In contrast, the dynamically-weighted aggregation (DWA) method changes the weights gradually when the evolution proceeds. If the Pareto-optimal front is concave, the bang-bang weighted aggregation (BWA) can also be used. In order to incorporate preferences, both RWA and DWA can be used.

Randomly Weighted Aggregation

In the framework of evolutionary optimization it is natural to take advantage of the population for obtaining multiple Pareto-optimal solutions in one run of the optimization. On the assumption that the i-th individual in the population has its own weight combination $(w_1^i(t), w_2^i(t))$ in generation t, the evolutionary algorithm will be able to find different Pareto-optimal solutions. To realize this, it can be found that the weight combinations need to be distributed uniformly and randomly among the individuals, and a re-distribution is necessary in each generation:

$$w_1^i(t) = \frac{rdm\ (P)}{P},$$

$$w_2^i(t) = 1.0 - w_1^i(t),$$

wherein i denotes the i-th individual in the population (i=1, 2, ..., P),

P is the population size (P∈N), and t is the index for the generation number (t∈$N_0$).

The function rdm (P) generates a uniformly distributed random number between 0 and P. In this way, a uniformly distributed random weight combination $(w_1^i, w_2^i)$ among the individuals can random weight combination $(w_1^i, w_2^i)$ among the individuals can be obtained, where $0 \leq w_1^i, w_2^i \leq 1$ and $w_1^i + w_2^i = 1$. In this context, it should be noted that the weight combinations are regenerated in every generation.

Dynamic Weighted Aggregation

In the dynamically-weighted aggregation (DWA) approach, all individuals have the same weight combination, which is changed gradually generation by generation. Once the individuals reach any point on the Pareto front, the slow change of the weights will force the individuals to keep moving gradually along the Pareto front if the Pareto front is convex. If the Pareto front is concave, the individuals will still traverse along the Pareto front, however, in a different fashion. The change of the weights can be realized as follows:

$$w_1(t) = |\sin(2\pi t/F)|,$$

$$w_2(t) = 1.0 - w_1(t).$$

where t is the number of generation. Here the sine function is used simply because it is a plain periodical function between 0 and 1. In this case, the weights $w_1(t)$ and $w_2(t)$ will change from 0 to 1 periodically from generation to generation. The change frequency can be adjusted by F. The frequency should not be too high so that the algorithm is able to converge to a solution on the Pareto front. On the other hand, it seems reasonable to let the weight change from 0 to 1 at least twice during the whole optimization.

In the above methods, it is assumed that all objectives are of the same importance. In this case, weights are changed between [0,1] in RWA and DWA to achieve all Pareto-optimal solutions. However, in many real-world applications, different objectives may have different importance. Thus, the goal is not to get the whole Pareto front, but only the desired part of the Pareto front. The importance of each objective is usually specified by the human user in term of preferences. For example, for a two-objective problem, the user may believe that one objective is more important than the other. To achieve the desired Pareto-optimal solutions, preferences need to be incorporated into multi-objective optimization. Instead of changing the weights between [0,1], they are changed between [$w^{min}$, $w^{max}$], where $0 \leq w^{min} < w^{max} \leq 1$, are defined by the preferences. Usually, the preferences can be incorporated before, during or after optimization. In this invention, preference incorporation before optimization is concerned.

As discussed in "Use of Preferences for GA-based Multi-Objective Optimization" (Proceedings of 1999 Genetic and Evolutionary Computation Conference, pp. 1504-1510, 1999) by Cvetkovic et al., the incorporation of fuzzy preferences before optimization can be realized in two ways:

Weighted Sum: Use of the preferences as a priori knowledge to determine the weight for each objective, then direct application of the weights to sum up the objectives to a scalar. In this case, only one solution will be obtained.

Weighted Pareto Method: The non-fuzzy weight is used to define a weighted Pareto non-dominance:

$$U \geq_w V \text{ if and only if } \frac{1}{k}\sum_{i=1}^{k} w_i I_\geq(u_i, v_i) \geq 1$$

with the utility sets

U:={$u_i$|i=1, 2, 3, ..., k} for $u_i \in$[0,1] and
V:={$v_i$|i=1, 2, 3, ..., k} for $v_i \in$[0,1], where $$I_\geq(u_i, v_i) = \begin{cases} 1 & \text{for } u_i \geq v_i \\ 0 & \text{for } u_i < v_i \end{cases} \text{ and } \sum_{i=1}^{k} w_i = 1.$$

Figure 2:
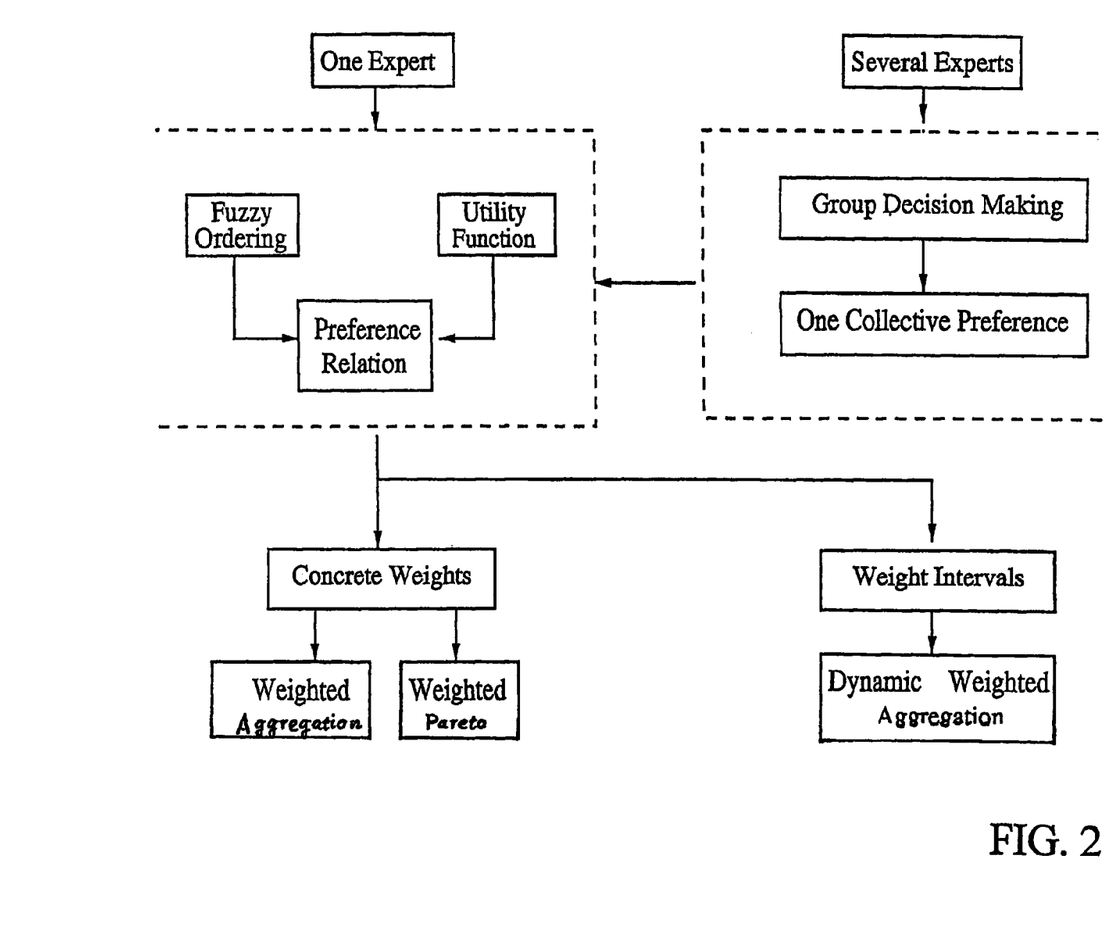
FIG. 2 shows schematically a procedure to apply-fuzzy preferences in MOO.
Figure 3A:
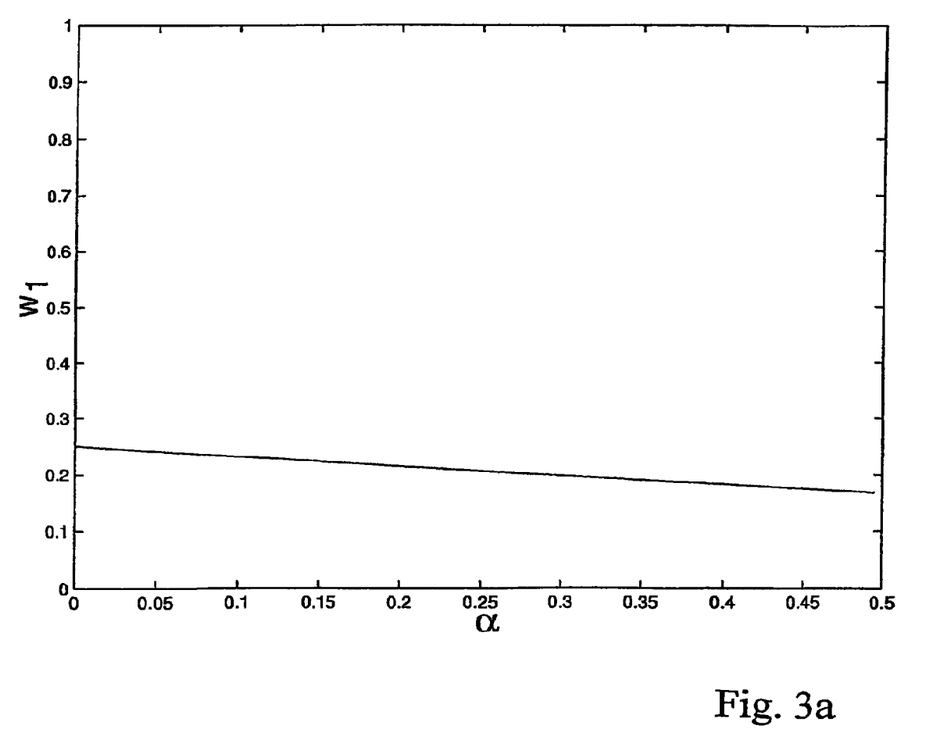
FIGS. 3a, 3b show the change of weights ($w_1$ and $w_2$) with the change of parameter ($\alpha$), respectively.
Figure 3B:
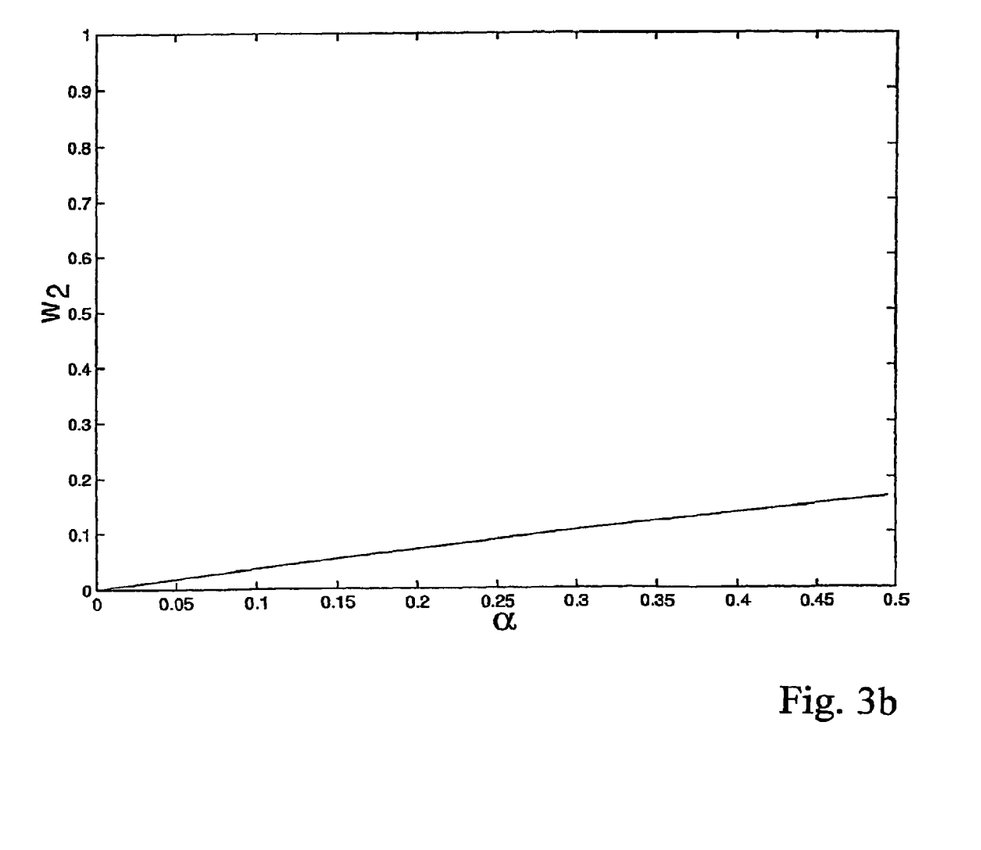
Figure 4A:
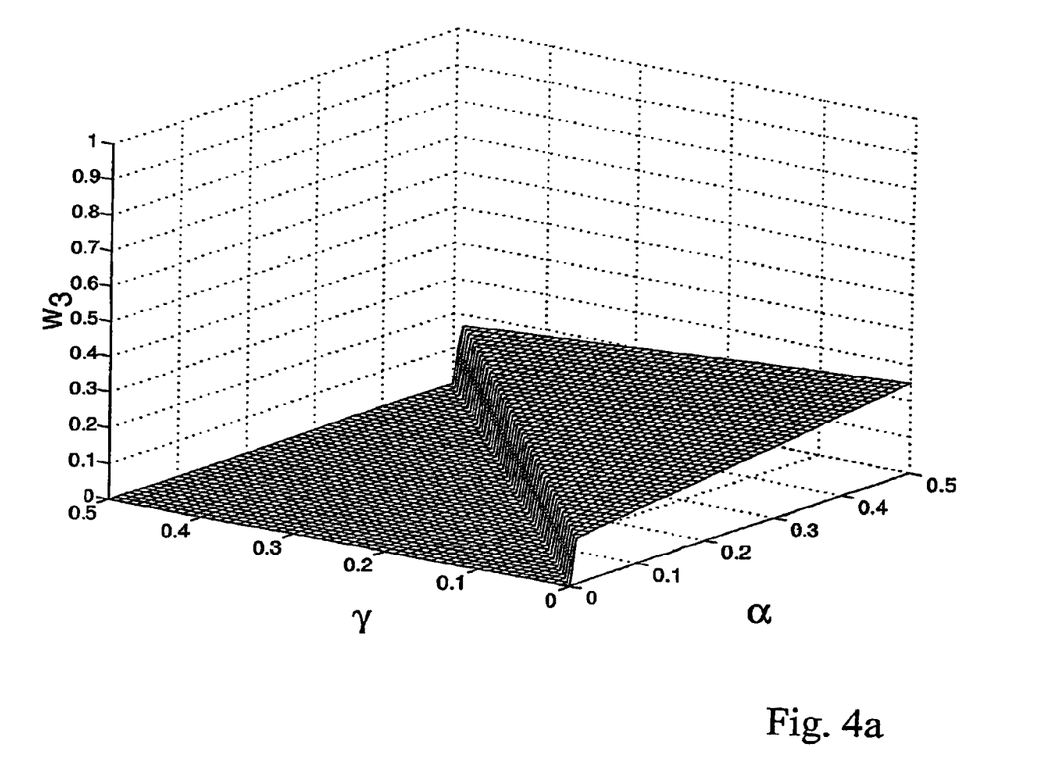
FIGS. 4a, 4b show the change of weights ($w_3$ and $w_4$) with the change of parameters ($\alpha$ and $\gamma$), respectively.
Figure 4B:
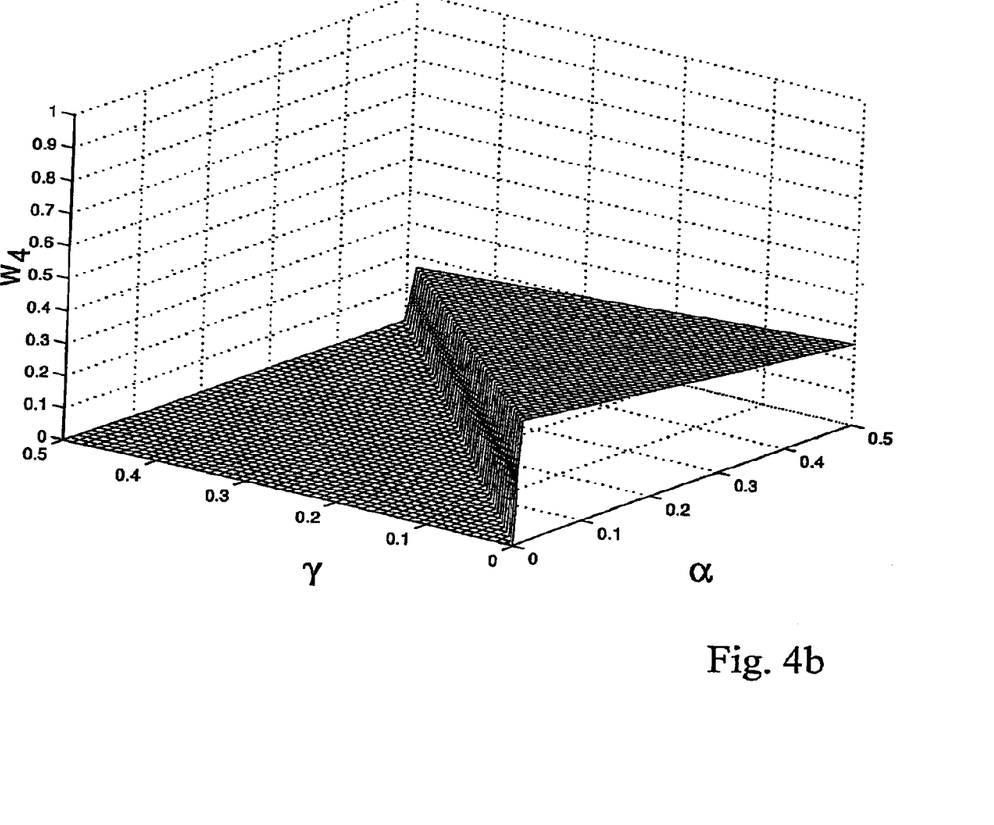

A general procedure for applying fuzzy preferences to multi-objective optimization is illustrated in FIG. 2. It can be seen that before the preferences can be applied in MOO, they have to be converted into crisp weights first. The procedure of conversion is described as follows:

Given L experts (with the indices m=1,2, ..., L) and their preference relation $\underline{P}^m$, where $\underline{P}^m$ is a (k×k)-matrix with $p_{ij}$ denoting the linguistic preference of the objective $o_i$ over the objective $o_j$ (with the indices i,j=1,2, ..., k). Then, based on the group decision-making method, they can be combined into a single collective preference $\underline{P}^c$. Each element of said preference matrix $\underline{P}^c$ is defined by one of the following linguistic terms:

"much more important" (MMI),

"more important" (MI),

"equally important" (EI),

"less important" (LI), and

"much less important" (MLI).

For the sake of simplicity, the superscript c indicating the collective preference is omitted in the following text. Before converting the linguistic terms into real-valued weights, they should at first be converted into numeric preferences. To this end, it is necessary to use the following evaluations, to replace the linguistic preferences $p_{ij}$ in the preference matrix, as indicated in "Use of Preferences for GA-based Multi-Objective Optimization" (Proceedings of 1999 Genetic and Evolutionary Computation Conference, pp. 1504-1510) by Cvetkovic et al.

a is much less important than b $\Rightarrow p_{ij}=\alpha$, $p_{ji}=\beta$ a is less important than b $\Rightarrow p_{ij}=\gamma$, $p_{ji}=\delta$ a is equally important as b $\Rightarrow p_{ij}=\in$, $p_{ji}=\in$.

The value of the parameters needs to be assigned by the decision-making and the following conditions should be satisfied in order not to lose the interpretability of the linguistic terms:

$$\alpha < \gamma < \in = 0.5 < \delta < \beta,$$

$$\alpha + \beta = 1 = \gamma + \delta.$$

Consider an MOO problem with six objectives $\{o_1, o_2, \ldots, o_6\}$ as used in "Use of Preferences for GA-based Multi-Objective Optimization" (Proceedings of 1999 Genetic and Evolutionary Computation Conference, pp. 1504-1510) by Cvetkovic et al. Suppose that among these six objectives $o_1$ and $o_2$, $o_3$ and $o_4$ are equally important. Thus, there are have four classes of objectives:

$$c_1:=\{o_1, o_2\}, c_2:=\{o_3, o_4\}, c_3:=\{o_5\} \text{ and } c_4:=\{o_6\}.$$

Besides, there are the following preference relations:

$c_1$ is much more important than $c_2$;

$c_1$ is more important than $c_3$;

$c_4$ is more important than $c_1$;

$c_3$ is much more important than $c_2$.

From these preferences, it is easy to get the following preference matrix:

$$\underline{P} = \begin{pmatrix} EI & MMI & MI & LI \\ MLI & EI & MLI & MLI \\ LI & MMI & EI & LI \\ MI & MMI & MI & EI \end{pmatrix}.$$

From the above fuzzy preference matrix, the following real-valued preference relation matrix R are obtained:

$$\underline{R} = \begin{pmatrix} \varepsilon & \beta & \delta & \gamma \\ \alpha & \varepsilon & \alpha & \alpha \\ \gamma & \beta & \varepsilon & \gamma \\ \delta & \beta & \delta & \varepsilon \end{pmatrix}.$$

Based on this relation matrix, the weight for each objective can be obtained by:

$$w(o_i) = \frac{S(o_i, \underline{R})}{\sum_{i=1}^{k} S(o_i, \underline{R})}$$

with $$S(o_i, \underline{R}) := \sum_{j=1, j\neq i}^{k} p_{ij}.$$

For the above example, this results in $$w_1 = w_2 = \frac{2-\alpha}{8+2\alpha},$$

$$w_3 = w_4 = \frac{3\alpha}{8+2\alpha},$$

$$w_5 = \frac{1-\alpha+2\gamma}{8+2\alpha}, \text{ and}$$

$$w_6 = \frac{3-\alpha-2\gamma}{8+2\alpha}.$$

Since $\alpha$ and $\gamma$ can vary between 0 and 0.5, one needs to heuristically specify a value for $\alpha$ and $\gamma$ (recall that $\alpha<\gamma$) to convert the fuzzy preferences into a single-valued weight combination, which can then be applied to a conventional weighted aggregation to achieve one solution.

In order to convert fuzzy preferences into one weight combination, it is necessary to specify a value for $\alpha$ and $\gamma$. On the one hand, there are no explicit rules on how to specify these parameters, on the other hand, a lot of information will be lost in this process.

In view of this disadvantage it is the target of the present invention to improve the use of fuzzy preferences for multi-objective optimization.

This target is achieved by means of the features of the independent claims. The dependent claims develop further the central idea of the present invention.

According to the main aspect of the invention, e.g. fuzzy preferences are converted into a weight combination with each weight being described by an interval instead of a single value.

Further objects, advantages and features of the invention will become evident for the man skilled in the art when reading the following detailed description of the invention and by reference to the figures of the enclosed drawings.

According to the underlying invention, linguistic fuzzy preferences can be converted into a weight combination with each weight being described by an interval.

FIGS. 3a, 3b, 4a, 4b show how the value of the parameters affects that of the weights. It can be seen from these figures that the weights vary a lot when the parameters ($\alpha$, $\gamma$) change in the allowed range. Thus, each weight obtained from the fuzzy preferences is an interval on [0,1]. Very interestingly, a weight combination in interval values can nicely be incorporated into a multi-objective optimization with the help of the RWA and DWA, which is explained e.g. in "Evolutionary Weighted Aggregation: Why does it Work and How?" (in: Proceedings of Genetic and Evolutionary Computation Conference, pp. 1042-1049, 2001) by Jin et al.

On the assumption that the maximal and minimal value of a weight are $w_{max}$ and $w_{min}$, when the parameters change, the weights are changed during an optimization algorithm in the following form, which is extended from RWA:

$$w_1^i(t) = w_1^{min} + (w_1^{max} - w_1^{min}) \cdot \frac{rdm\ (P)}{P},$$

where t is the generation index. Similarly, by extending the DWA, the weights can also be changed in the following form to find out the preferred Pareto solutions:

$$w_1^i(t) = w_1^{min} + (w_1^{max} - w_1^{min}) \cdot |\sin(2\pi t/F)|,$$

where t is the generation index. In this way, the evolutionary algorithm is able to provide a set of Pareto solutions that are reflected by the fuzzy preferences. However, it is recalled that DWA is not able to control the movement of the individuals if the Pareto front is concave, therefore, fuzzy preferences incorporation into MOO using DWA is applicable to convex Pareto fronts only, whereas the RWA method is applicable to both convex and concave fronts.

To illustrate the underlying invention, some examples on two-objective optimization using the RWA are presented in the following. In the simulations, two different fuzzy preferences are considered:

1. Objective 1 is more important than objective 2;
2. Objective 1 is less important than objective 2.

For the first preference, one obtains the following preference matrix:

$$\underline{P} = \begin{pmatrix} 0.5 & \delta \\ \gamma & 0.5 \end{pmatrix},$$

with $0.5 < \delta < 1$ and $0 < \gamma < 0.5$. Therefore, the weights for the two objectives using the RWA method are:

$$w_1^i(t) = 0.5 + 0.5 \cdot \frac{rdm(P)}{P},$$

$$w_2^i(t) = 1.0 - w_1^i(t).$$

Similarly, the following weights are obtained for the second preference:

$$w_1^i(t) = 0 + 0.5 \cdot \frac{rdm(P)}{P},$$

$$w_2^i(t) = 1.0 - w_1^i(t).$$

To summarize, the invention proposes a method to obtain the Pareto-optimal solutions that are specified by human preferences. The main idea is to convert the fuzzy preferences into interval-based weights. With the help of the RWA and DWA, it is shown to be successful to find the preferred solutions on two test functions with a convex Pareto front. Compared to the method described in "Use of Preferences for GA-based Multi-Objective Optimization" (Proceedings of 1999 Genetic and Evolutionary Computation Conference, pp. 1504-1510, 1999) by Cvetkovic et al., the method according to the invention is able to find a number of solutions instead of only one, given a set of fuzzy preferences over different objectives. This is consistent with the motivation of fuzzy logic.

Many technical, industrial and business applications are possible for evolutionary optimization. Examples for applications can be found e.g. in "Evolutionary Algorithms in Engineering Applications" (Springer-Verlag, 1997) by Dasgupta et al., and "Evolutionary Algorithms in Engineering and Computer Science" (John Wiley and Sons, 1999) by Miettinnen et al.

The invention claimed is:

1. A method for multi-objective optimization of a mechanical, aerodynamic or hydrodynamic body using evolutionary algorithms, the method comprising the steps of:
   (a) encoding object parameters of the mechanical, aerodynamic or hydrodynamic body to be optimized as individuals;
   (b) setting up an initial population of the individuals as parents;
   (c) reproducing a plurality of offspring individuals from the parents, the individuals representing object parameters to be optimized;
   (d) evaluating quality of the offspring individuals using a fitness function comprising a sum of weighted sub-functions, each weighted sub-function corresponding to an objective of the multiple objective optimization;
   (e) selecting the one or more offspring individuals having the highest evaluated quality value as parents for a next evolution cycle;
   (f) changing weights of the weighted sub-functions for the next cycle within predetermined ranges, a first weight of the weighted sub-functions changing within a first predetermined range, a second weight of the weighted sub-functions changing within a second predetermined range different from the first predetermined range, the first predetermined range and the second predetermined range representing preferences given to objectives of the multiple objective optimization;
   (g) repeating steps (c) to (f) until a termination criterion is met; and
   (h) outputting one or more offspring individuals after the termination criterion is met as the optimized object parameters of the mechanical, aerodynamic or hydrodynamic body.

2. The method of claim 1, further comprising the step of:
   converting preferences of the objectives represented as relative language into parameterized values to generate the first and second predetermined ranges within which the sub-functions can change.

3. The method of claim 2 further comprising the step of: converting the preferences into parameterized values comprises assigning values within the first and second predetermined ranges to the parameterized values.

4. The method of claim 1, wherein the weights of the weighted sub-functions are randomly re-distributed within the first and second predetermined ranges among the different offspring individuals in each cycle.

5. The method of claim 1, further comprising the step of: gradually changing the weights of the weighted sub-functions within the first and second predetermined ranges with change in the cycle.

6. The method of claim 5, further comprising the step of: changing the weights within the predetermined ranges according to a periodic function.

7. The method of claim 5, wherein each offspring individual is evaluated using the same weighted sub-functions in the same cycle.

8. The method of claim 5, wherein the at least one weight generated from a sine function having a number of the cycle as its argument.

9. A computer product for multi-objective optimization of a mechanical, aerodynamic or hydrodynamic body, the computer program product comprising a computer readable storage medium structured to store instructions executable by a processor, the instructions, when executed cause the processor to:

(a) encode object parameters of the mechanical, aerodynamic or hydrodynamic body to be optimized as individuals;

(b) set up an initial population of the individual as parents;

(c) reproduce a plurality of offspring individuals from the parents, the individuals representing object parameters to be optimized;

(d) evaluate quality of the offspring individuals using a fitness function comprising a sum of weighted sub-functions, each weighted sub-function corresponding to an objective of the multiple objective optimization;

(e) select the one or more offspring individuals having the highest evaluated quality value as parents for a next evolution cycle;

(f) change weights of the weighted sub-functions for the next cycle within predetermined ranges, a first weight of the weighted sub-functions changing within a first predetermined range, a second weight of the weighted sub-functions changing within a second predetermined range different from the first predetermined range, the first predetermined range and the second predetermined range representing preferences given to objectives of the multiple objective optimization;

(g) repeat steps (a) to (f) until a termination criterion is met; and (h) output one or more offspring individuals after the termination criterion is met as the optimized object parameters of the mechanical, aerodynamic or hydrodynamic body.

* * * * *

UNITED STATES PATENT AND TRADEMARK OFFICE
CERTIFICATE OF CORRECTION

PATENT NO. : 7,383,236 B2
APPLICATION NO. : 10/501378
DATED : June 3, 2008
INVENTOR(S) : Yaochu Jin et al.

It is certified that error appears in the above-identified patent and that said Letters Patent is hereby corrected as shown below:

Column 10, line 23, after "repeat steps," delete "(a)" and insert --(c)--.

Signed and Sealed this

Eleventh Day of November, 2008

JON W. DUDAS
*Director of the United States Patent and Trademark Office*